United States Patent [19]

Fournier et al.

[11] Patent Number: 5,743,711
[45] Date of Patent: Apr. 28, 1998

[54] MECHANICALLY ASSEMBLED TURBINE DIAPHRAGM

[75] Inventors: Maurice D. Fournier, Clifton Park; David C. Gonyea, Scotia; George Reluzco, Schenectady; Kenneth J. Robertson, Schenectady; John P. McGrane, Schenectady, all of N.Y.

[73] Assignee: General Electric Co., Schenectady, N.Y.

[21] Appl. No.: 784,897

[22] Filed: Jan. 16, 1997

Related U.S. Application Data

[62] Division of Ser. No. 588,030, Jan. 17, 1996, which is a division of Ser. No. 298,019, Aug. 30, 1994, abandoned.

[51] Int. Cl.$^6$ .................................................. F04D 29/44
[52] U.S. Cl. ........................... 415/209.2; 415/209.3
[58] Field of Search ........................ 415/209.1, 209.2, 415/209.3, 209.4, 210.1

[56] References Cited

U.S. PATENT DOCUMENTS 2,295,012  9/1942  Semar ................................ 416/215
2,916,257  12/1959  Poellmitz et al. ................. 416/215

FOREIGN PATENT DOCUMENTS 49511  4/1980  Japan ................................ 415/210.1

*Primary Examiner*—John T. Kwon
*Attorney, Agent, or Firm*—Nixon & Vanderhye

[57] ABSTRACT

The turbine includes inner and outer rings and partitions mechanically connected therebetween. In one form, the partitions have connecting elements at tip and root portions of the vanes which are received in complementary grooves in the outer and inner rings, respectively. The partitions in one form are stacked against one another and secured by end lugs at the diaphragm joints. In another form, the partitions are pinned to the outer and inner rings with spaces between the connecting elements to avoid accumulation of tolerances. In a third form, the partitions are applied against the outer and inner rings in an axial direction and retainer plates are bolted to the outer and inner rings to secure the partitions in the diaphragm assembly. In all cases, the diaphragm is formed without welding.

13 Claims, 10 Drawing Sheets

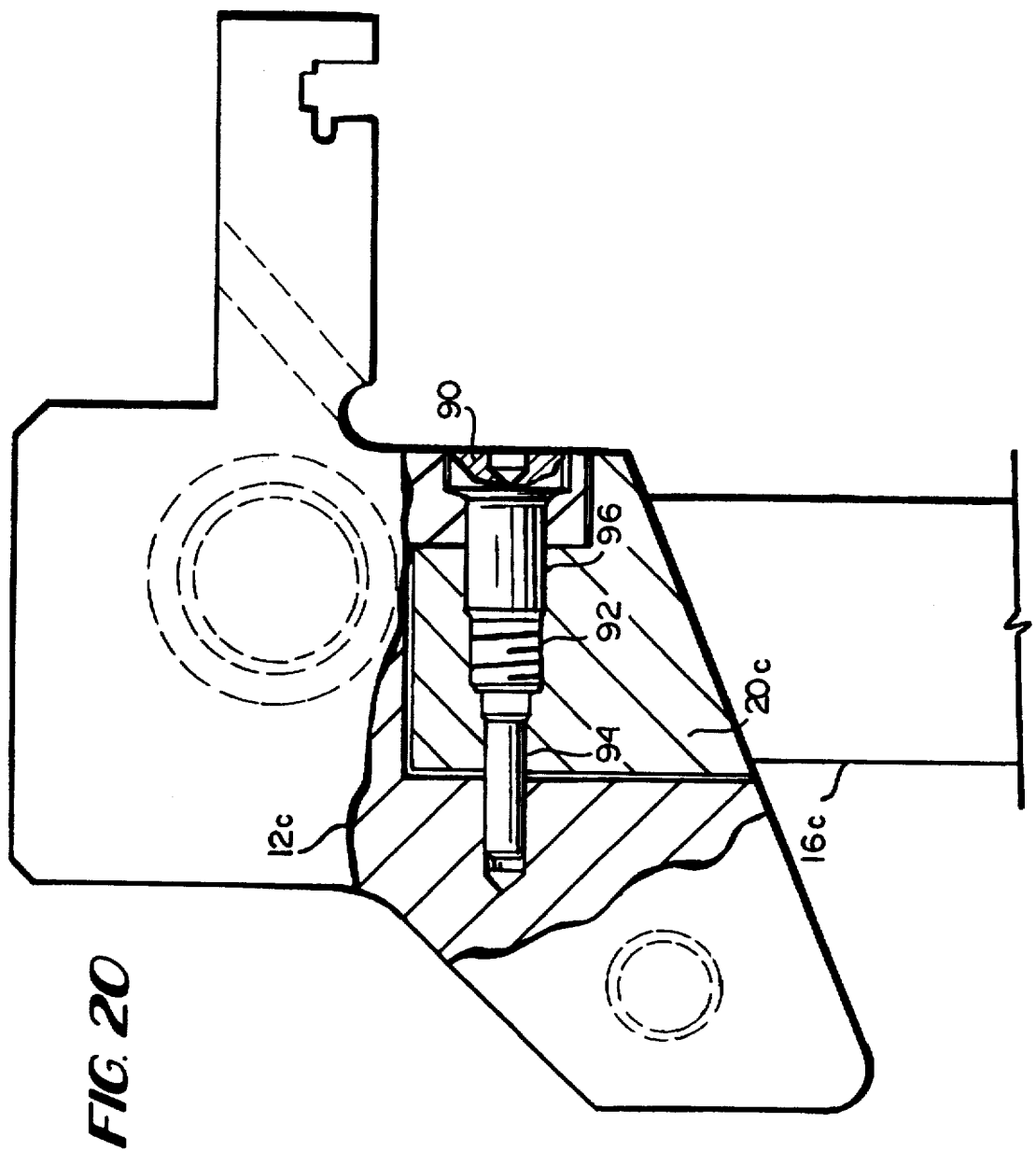

MECHANICALLY ASSEMBLED TURBINE DIAPHRAGM

RELATED APPLICATIONS

This application is divisional of application Ser. No. 08/588,030, filed Jan. 17, 1996, which, in turn, is a divisional of application Ser. No. 08/298,019, filed Aug. 30, 1994, now abandoned.

TECHNICAL FIELD

The present invention relates to a diaphragm assembly for turbines, particularly steam turbines, and particularly relates to inner and outer rings and partitions mechanically connected between the outer and inner rings and methods of assembly.

BACKGROUND

Current turbine diaphragms, particularly steam turbine diaphragms, typically comprise outer and inner rings, outer and inner spacer bands and vanes having airfoil shapes disposed between the spacer bands and rings whereby the vanes form an annular flow path assembly. The vanes are conventionally welded to the spacer bands which, in turn, are welded to the outer and inner rings. The vanes thus form nozzles for flowing gas, for example, steam between the vanes.

There are several aspects of current diaphragm designs and manufacturing processes which are not desirable. For example, current techniques require that the assembly be completed in a sequential manner with all of the components of the assembly being required early in the manufacturing cycle. It would be desirable to complete diaphragm components in parallel and complete the diaphragm at time of final assembly. Further, welding causes a number of problems. Welding defects frequently occur in the formation of the diaphragm, requiring their repair. Welding distortion also results in poor dimensional control of the flow path geometry which, in turn, degrades efficiency. A diaphragm assembly where welding would be eliminated would reduce those defects and would improve dimensional control. Further, field replacement of a flow path is not a viable option in welded assemblies. A mechanically assembled flow path, however, could be replaced in the field. In welded assemblies, stress relief heat treatments are also required during manufacture of the diaphragm. A mechanical assembly of the components of the assembly would not require stress relief. The stress relief heat treatments also degrade the surface finish of the nozzle vanes, as do the machining operations in the welded assembly. A mechanically assembled diaphragm, on the other hand, would not affect the nozzle surface finish.

DISCLOSURE OF THE INVENTION

According to the present invention, there is provided a mechanically assembled diaphragm for a turbine and methods for assembly which replace the conventional welded fabrication of the diaphragm with a simpler, more cost-effective mechanical assembly which reduces manufacturing costs, improves dimensional control of the flow path, does not deleteriously affect nozzle surface finish and enables field replacement of diaphragm flow paths. To accomplish the foregoing, the present invention provides, as basic components for a turbine diaphragm, an outer ring, an inner ring and a plurality of partitions. The outer and inner rings are preferably split into halves at a horizontal joint such that each of the upper and lower diaphragm halves is 180° in circumferential extent. It will be appreciated, of course, that the rings could be split otherwise whereby the diaphragm assembly could comprise more than two circumferential diaphragm portions, for example, four circumferential portions 90° each. In a preferred embodiment, the upper and lower halves of the diaphragm are secured together at the horizontal joint. Additionally, the partitions include one or more stator vanes having an airfoil shape with integral blocks or connecting elements at the inner and outer ends or root and tip portions of the partitions for mechanical assembly with the inner and outer rings. Each partition may therefore comprise a single vane with an inner and outer connecting element at the opposite ends of the vanes. Alternatively, each partition may comprise two or more vanes with inner and outer connecting elements at the opposite ends of the two or more vanes, the vanes and connecting elements forming an integral one-piece, preferably cast, construction.

In the present invention, the partitions are structurally connected to the outer and inner rings solely by mechanical connections. Use of conventional welds for connecting partitions and outer and inner rings to one another are specifically excluded in favor only of the mechanical connections hereof, such as use of dovetails, pins and bolts, as described hereafter.

In a preferred form of the present invention, the connecting elements at each of the opposite ends of the partition have a dovetail configuration. The inner and outer rings have complementary dovetail-shaped grooves for receiving the dovetail-shaped connecting elements, respectively. Thus, the connecting elements for each partition may be inserted simultaneously into the grooves of the inner and outer rings at a horizontal joint in a tangential direction with the connecting elements of the partitions stacking against one another tangentially within the complementary-shaped grooves of the inner and outer rings. Lugs may be provided at each horizontal joint to preload the partitions in a tangential direction and also transmit the torque applied to the diaphragm by the flow through the nozzles. The generally complementary dovetail configurations of the connecting elements and the grooves in the inner and outer rings are arcuate as viewed in an axial direction and the loads on the vanes during turbine operation are transmitted to the turbine casing through these complementary dovetail surfaces.

In another form of the present invention, each partition is pinned to the inner and outer ring. For example, openings are provided through the inner and outer rings and the connecting elements of the partitions, the openings extending preferably in an axial direction. Upon insertion of the partitions in the tangential direction in the inner and outer rings and registration of the openings of the connecting elements with the openings through the rings, one or more pins are inserted to secure the partitions to the rings. Preferably, the partitions are dimensioned to provide a small clearance in the tangential direction between the connecting elements of adjacent partitions such that the partitions are not stacked directly against one another in a circumferential direction. Thus, accumulation of tolerances which occurs when partitions are directly stacked against one another is avoided. In this form also, the connecting elements do not require any portions thereof to be arcuate or curved, which is an advantageous feature from a manufacturing standpoint. The loads applied to the diaphragm are transmitted to the turbine casing through the pins.

In a further form of the present invention, outer and inner retaining plates may be bolted to the outer and inner rings.

respectively, to secure the partitions in their annular array about the diaphragm. In this form, each partition is applied against the outer and inner ring in an axial direction, with the partitions stacking against one another in a circumferential direction. The outer and inner retaining plates are applied to axially overlie the connecting elements and the outer and inner rings, respectively. The retaining plates are then bolted to the outer and inner rings. Preferably, the connecting elements of the partitions provide a dovetail or tongue-and-groove connection with the retaining plates. Torque applied on the diaphragm by the fluid flow through the nozzles is transmitted by friction across the clamped surfaces. Pins through the rings and partitions may also be used to transmit the torque load, if necessary. The pressure loads are transmitted through the mating tongue-and-groove surfaces and the retaining plate bolts. Preferably, the load-bearing tongue-and-groove surfaces on the partitions and rings have a curvature.

In a preferred embodiment according to the present invention, there is provided a mechanically assembled turbine diaphragm comprising outer and inner rings, a plurality of partitions, each having an airfoil shape for disposition in the flow path of the turbine diaphragm, a connecting element carried by the partitions at each of the opposite outer and inner ends thereof for connecting the partitions to the outer and inner rings, respectively, to form with the outer and inner rings the turbine diaphragm and means for mechanically connecting the outer and inner elements to the outer and inner rings, respectively, to form at least a portion of the turbine diaphragm.

In a further preferred embodiment according to the present invention, there is provided a method for mechanically assembling a turbine diaphragm having outer and inner rings, a plurality of partitions, each having an airfoil shape for disposition in the flow path of the turbine diaphragm and a connecting element at each of the opposite outer and inner ends thereof, comprising the step of mechanically connecting the outer and inner elements to the outer and inner rings, respectively, to form at least a portion of the turbine diaphragm.

Accordingly, it is a primary objection of the present invention to provide a novel and improved mechanically assembled turbine diaphragm and methods of assembly.

BRIEF DESCRIPTION OF THE DRAWINGS

FIG. 20 is an enlarged cross-sectional view of a further form of bolted connection in accordance with the present invention.

BEST MODE FOR CARRYING OUT THE INVENTION

Figure 1:
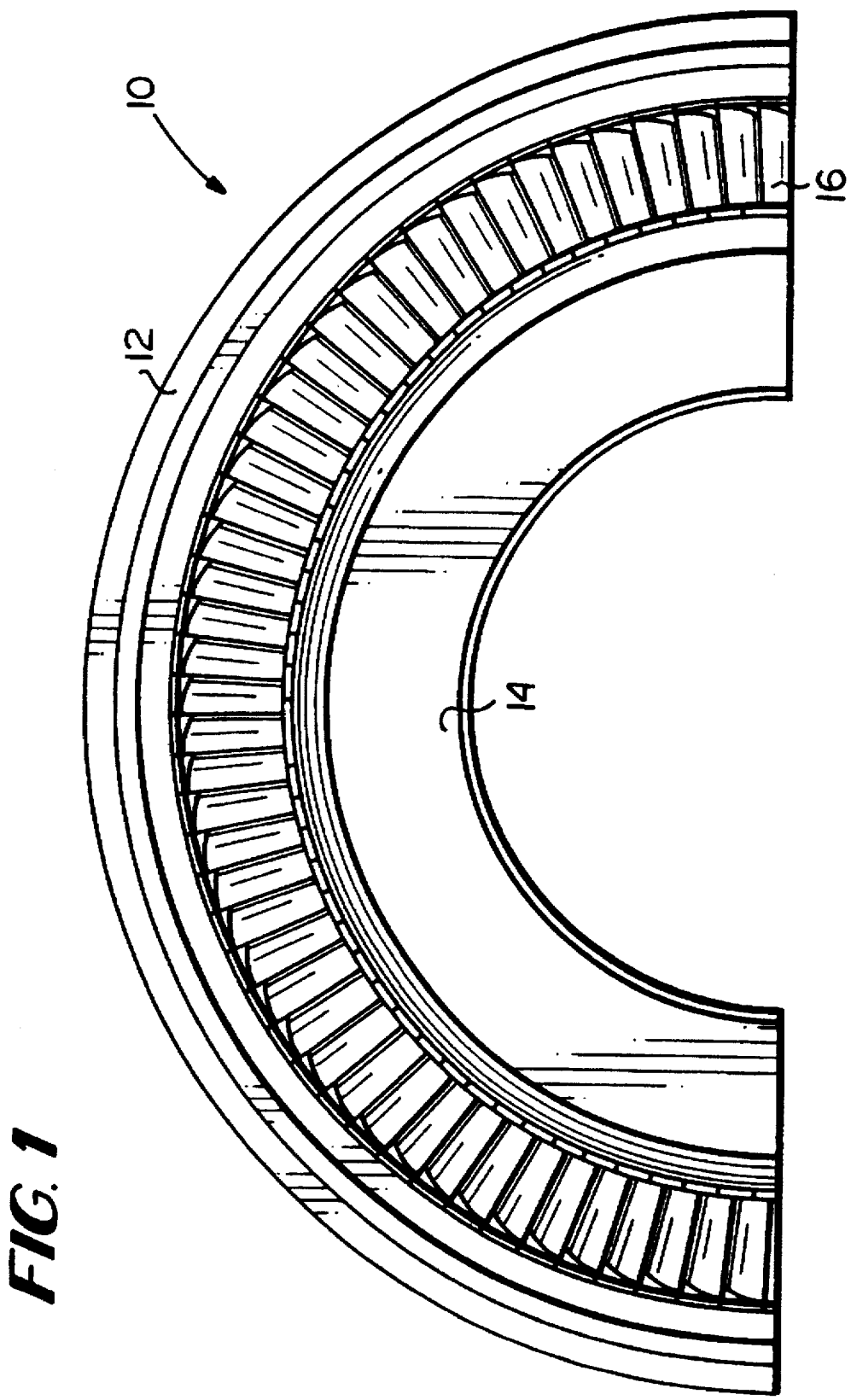
FIG. 1 is an axial view of a diaphragm half in assembled condition according to the present invention.

Referring now to FIG. 1, there is illustrated a section of a diaphragm, generally designated 10, for a turbine, particularly a steam turbine. The illustrated diaphragm section 10 comprises one-half of a completed diaphragm, i.e., a 180° segment of the diaphragm. In accordance with the present invention, each diaphragm segment includes an outer ring 12, an inner ring 14 and a plurality of partitions 16 extending between the outer and inner rings 12 and 14, respectively, forming nozzles and hence a flow path for a turbine. It will be appreciated that the diaphragm halves are brought together to form a complete annular array of partitions with the halves preferably being bolted to one another at the horizontal joint by means not shown.

Figure 4:
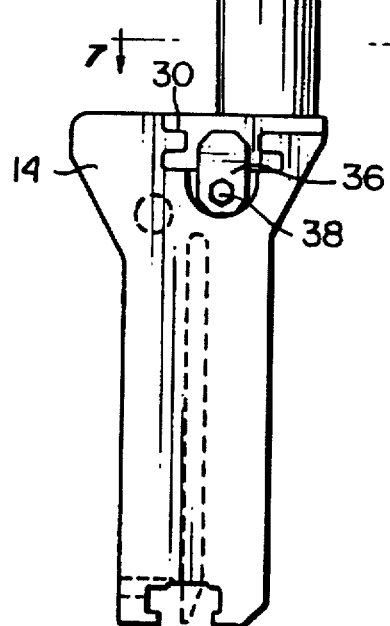
FIGS. 4 and 5 are axial and side elevational views, respectively, of a partition for the diaphragm half of FIG. 1.
Figure 4:
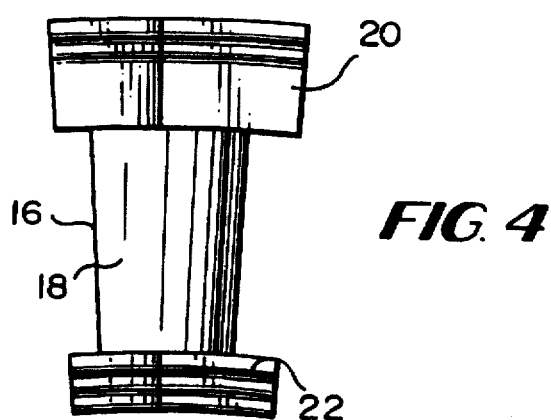
Figure 5:
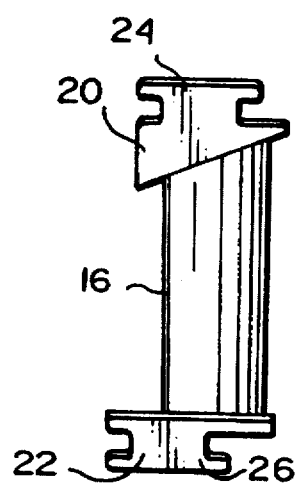

Referring now to FIGS. 4 and 5, each partition 16 includes a vane 18 having an airfoil shape and end blocks or connecting elements 20 and 22 formed at the opposite ends of the vane 18. That is, the end blocks or connecting elements 20 and 22 are formed at the tip and root portions, respectively, of the vane. It will be appreciated that, while only a single vane 18 and outer and inner connecting elements 20 and 22, respectively, are illustrated as comprising a partition 16, each partition may include two or more vanes with the connecting elements 20 and 22 spanning the respective tip and root portions of those vanes. Thus, a single connecting element 20 may be formed at the tip of one or more of vanes 18. Similarly, a single connecting element 22 may be formed at the root of one or more vanes 18. It will also be appreciated that the partitions are preferably integrally formed, e.g., cast, as separate and discrete parts for later mechanical assemblage into the diaphragm as described hereinafter.

Figure 2:
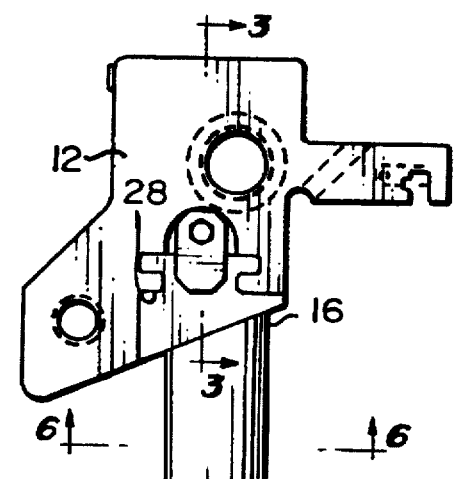
FIG. 2 is an enlarged end view of the diaphragm half of FIG. 1 illustrating the partitions and outer and inner rings.

The outer connecting element 20 has a dovetail configuration 24. Similarly, the inner connecting element 22 has a dovetail configuration 26. Referring to FIG. 2, the outer ring 12 has a radially inwardly opening groove having a dovetail configuration 28 generally complementary in shape to the dovetail configuration 24 of the outer connecting element 20. Similarly, the inner ring 14 has a radially outwardly opening groove having a dovetail configuration 30 generally complementary in shape to the dovetail configuration 26 of the inner connecting element 22. As will be appreciated from a review of FIGS. 1 and 4, the dovetails 24, 26, 28 and 30 are circular or arcuate in configuration when viewed axially of the diaphragm.

Figure 3:
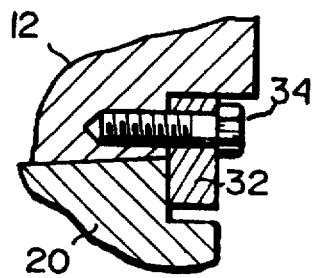
FIG. 3 is a cross-sectional view thereof taken generally about on line 3—3 in FIG. 2.

Referring to FIG. 3, a lug 32 is secured to the outer ring 12, preferably at the joint between the diaphragm halves, by a bolt 34. The lug 32 overlies a portion of the outer connecting element 20 of the partition 16 to maintain the partitions stacked one against the other in the groove of the outer ring. In FIG. 2, there is illustrated a similar lug 36 bolted at 38 to the inner ring 14 to overlie for like purposes the end connecting element 30 of the elements 30 in the groove of the inner ring.

Figure 7:
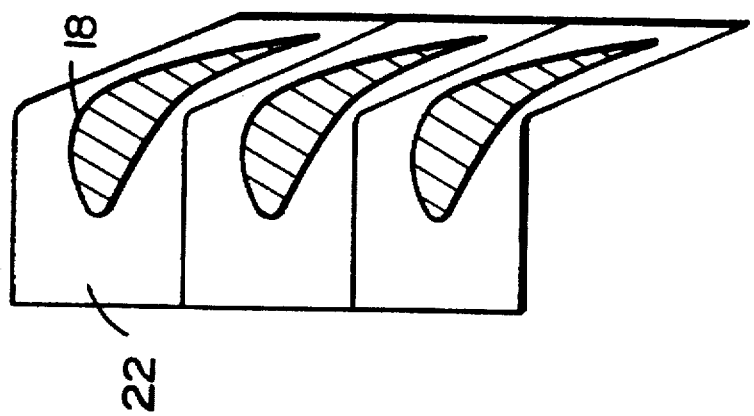
FIGS. 6 and 7 are cross-sectional views taken generally about on lines 6—6 and 7—7, respectively, in FIG. 2.
Figure 6:
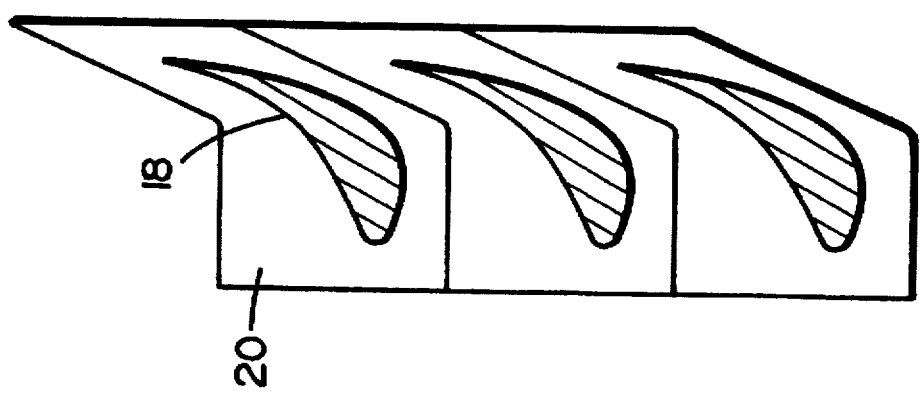

To mechanically assemble the diaphragm, each partition is inserted simultaneously into the outer and inner rings 12 and 14, respectively, at the ends of the rings and in a tangential direction. Clearances between the partition connecting elements and the outer and inner rings enable the partitions to slide in a tangential direction. As illustrated in FIGS. 6 and 7, the partitions stack directly against one another in their mechanical assembly. Particularly, upon insertion tangentially into the inner and outer rings, the connecting elements 20 stack one against the other in the groove of the outer ring 12, while the connecting elements 22 stack one against the other in the groove of the inner ring 14. When fully tangentially inserted, the lugs 32 and 36 are applied to the rings to preload the nozzles in a tangential direction. It will be appreciated that by the foregoing assembly, welds are completely eliminated and the partitions are held in the diaphragm assembly only through the mechanical assembly. Upon completion of the assemblage, the diaphragm segments may be secured to one another at their joints to form a complete diaphragm.

Figure 8:
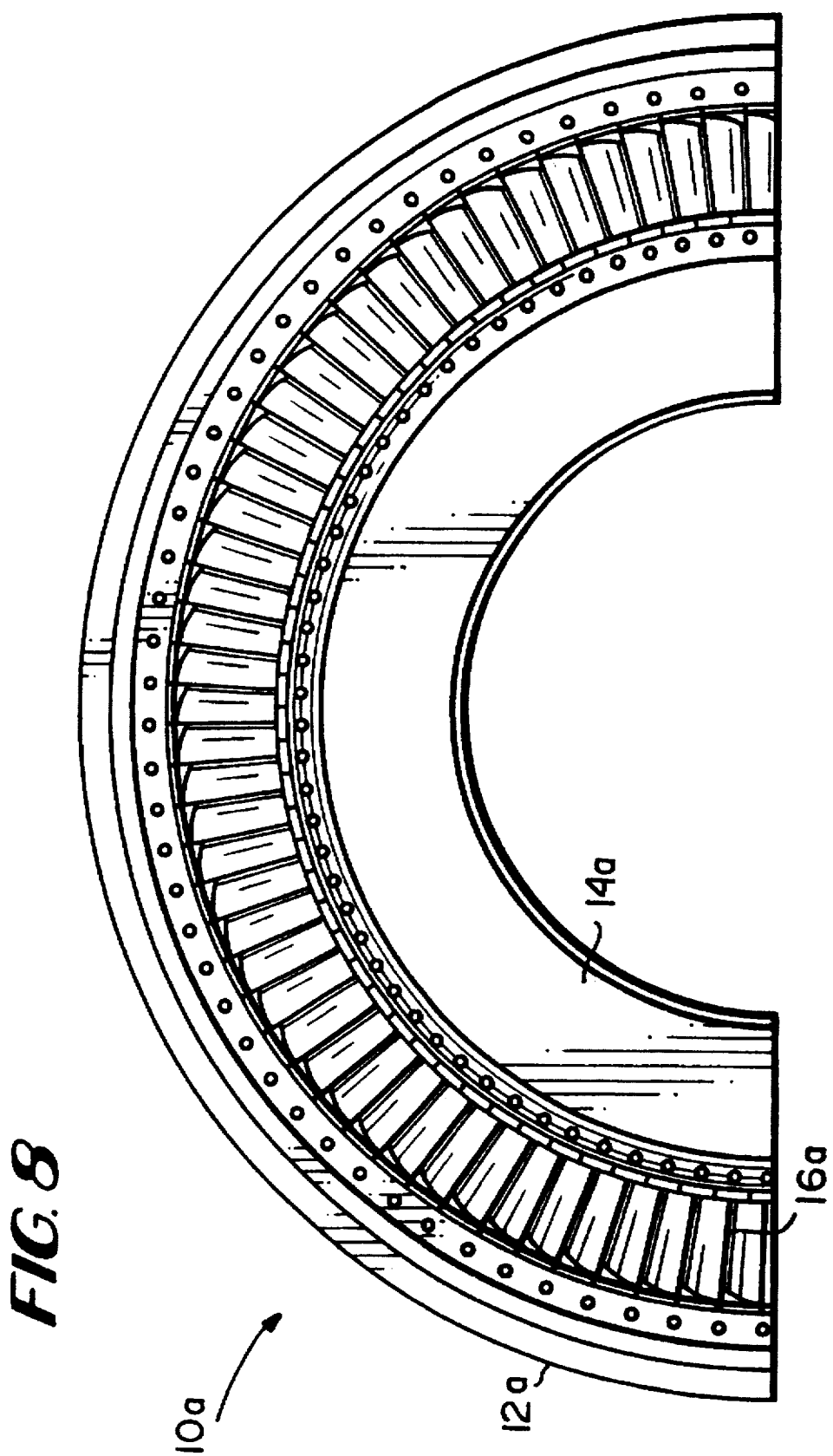
FIG. 8 is a view similar to FIG. 1 illustrating a further form of the present invention.
Figure 9:
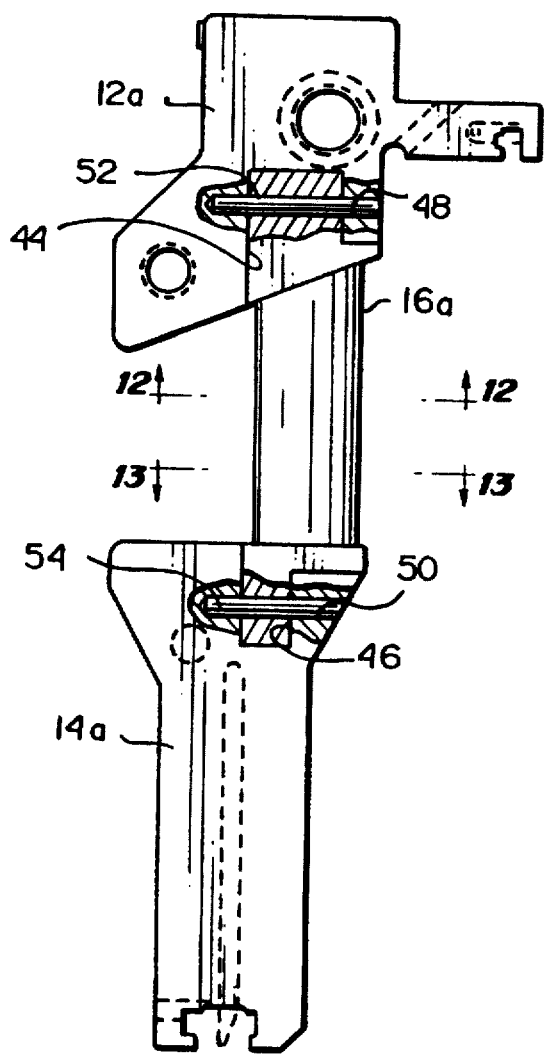
FIG. 9 is a view similar to FIG. 2 illustrating a second embodiment of the invention illustrated in FIG. 8.
Figure 10:
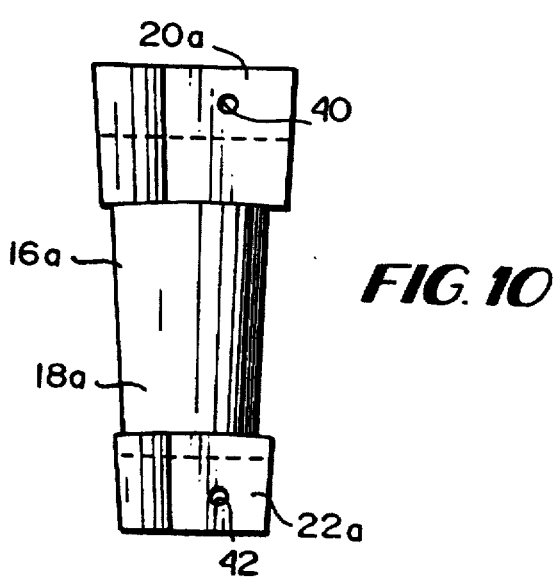
FIGS. 10 and 11 are axial and side elevational views of partitions for use in the diaphragm half of FIG. 8.
Figure 11:
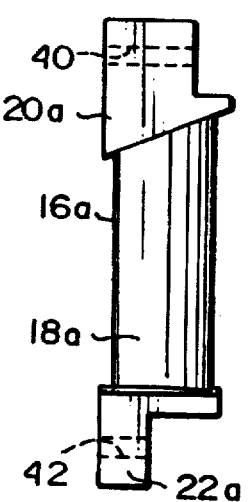
Figure 13:
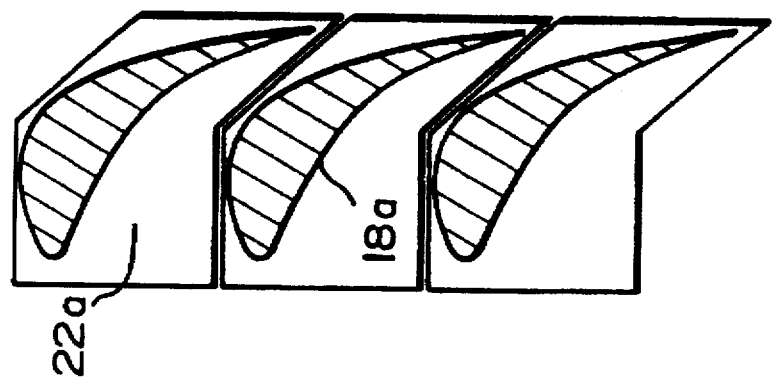
FIGS. 12 and 13 are cross-sectional views taken generally about on lines 12—12 and 13—13, respectively, in FIG. 9.
Figure 12:
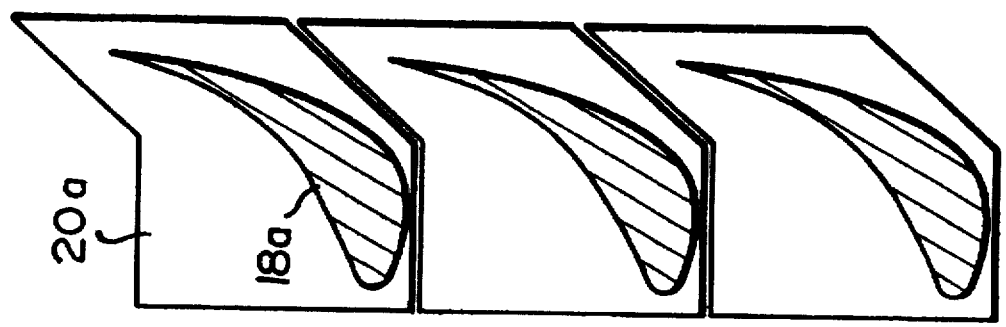
Figure 14:
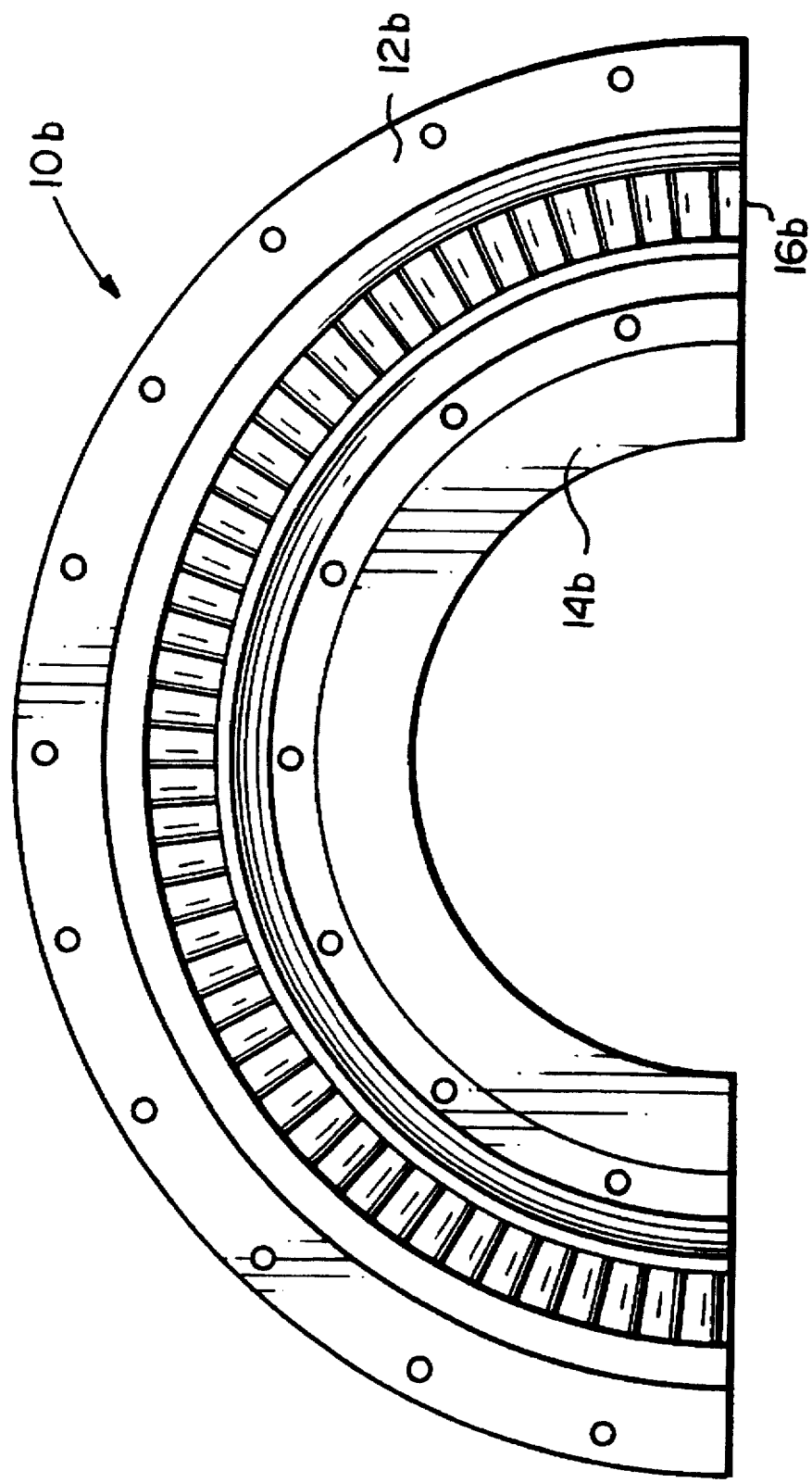
FIG. 14 is a view similar to FIG. 1 illustrating a still further embodiment of the present invention employing a bolted mechanical assembly.

Referring now to the embodiment hereof illustrated in FIGS. 8–13, wherein like reference numerals are applied to like parts, followed by the suffix "a," there is illustrated a diaphragm half 10a having outer and inner rings 12a and 14a, respectively, and a plurality of partitions 16a connecting between the outer and inner rings 12a and 14a. As best illustrated in FIGS. 10 and 11, each partition 16a comprises a vane 18a having an airfoil configuration and connecting elements 20a and 22a at its outer and inner or tip and root ends, respectively. In this form, however, the connecting elements 20a and 22a are provided with one or more openings 40 and 42, respectively, extending generally in the axial direction. Also, the surfaces defining the connecting elements 20a and 22a are rectilinear and do not require curvature in the circumferential direction as in the previous embodiment. As in the previous embodiment, the connecting elements 20a and 22a may be formed on the ends of the single vane or two or more vanes.

Referring now to FIG. 9, the outer ring 12a has an inwardly opening groove 44 for receiving the connecting elements 20a, while the inner ring 14a has a radially outwardly opening groove 46 for receiving the connecting elements 22a. As illustrated in FIG. 8, a plurality of openings 48 and 50 are provided in an axial direction through the outer and inner rings 12a and 14a, respectively, for registration with openings 40 and 42. It will be appreciated that additional openings 48 and 50 through each of the outer and inner rings, as well as through the connecting elements 20a and 22a, may be provided for purposes of pinning the partitions to the rings, as will now be explained. As in the prior embodiment, the connecting elements of each partition are inserted simultaneously into the outer and inner rings 12a and 14a, respectively, at the end of the diaphragm segment and in a tangential direction. Particularly, the connecting element 20a of each partition is received in the groove 44 of outer ring 12a and the connecting element 22a of each partition is received in the groove 46 of inner ring 14a. Clearance between the partitions and the inner and outer rings enables the partitions to slide in a tangential direction. With the openings 40, 42, 48 and 50 being preformed prior to assembly, the partitions are inserted such that the openings 48 lie in registry with the openings 40 and the openings 50 lie in registry with the openings 42. Pins 52 and 54 are then inserted into the registering openings adjacent the outer and inner portions of the diaphragm segments to secure the partitions to the outer and inner rings, respectively. The pins are subsequently and preferably peened to prevent their removal from the registering openings.

In this embodiment, the partitions are dimensioned such that, rather than being stacked in a circumferential direction directly against one another, there is a small clearance in the tangential direction between each partition. This feature enables any accumulation of tolerances which may occur when partitions are stacked directly against one another to be avoided. Further, the only tight tolerances necessary are the location and size of the pin holes and the size of the pins.

Figure 15:
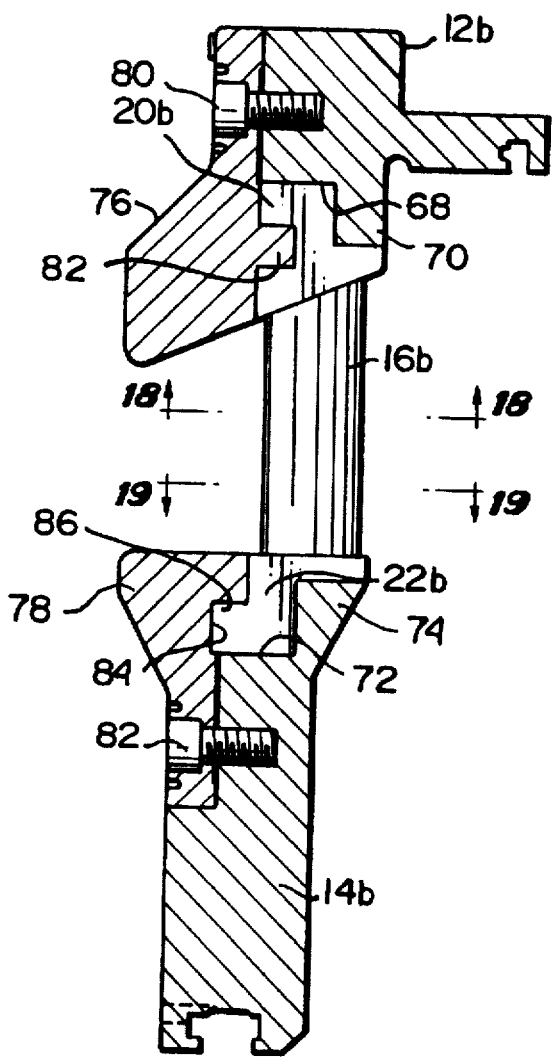
FIG. 15 is an enlarged cross-sectional view through the diaphragm half of FIG. 14.
Figure 16:
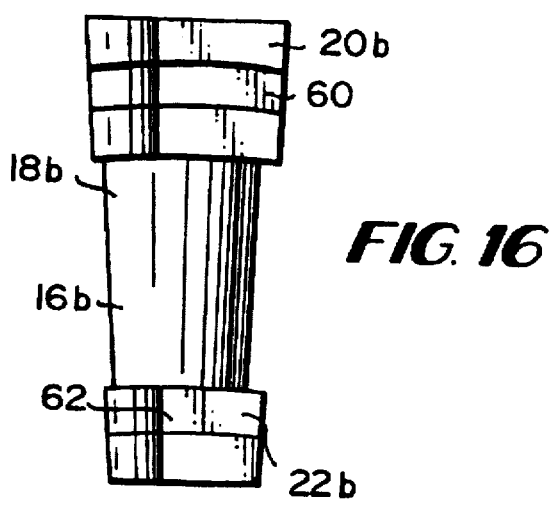
FIGS. 16 and 17 are axial and side elevational views of the partitions for use in the diaphragm half of FIG. 14.
Figure 17:
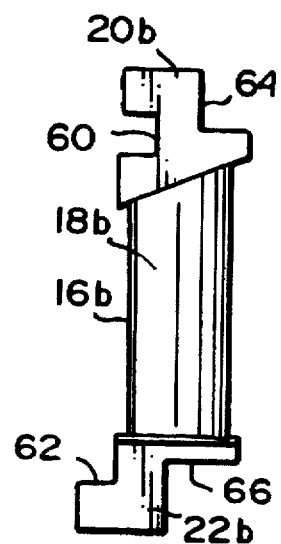
Figure 19:
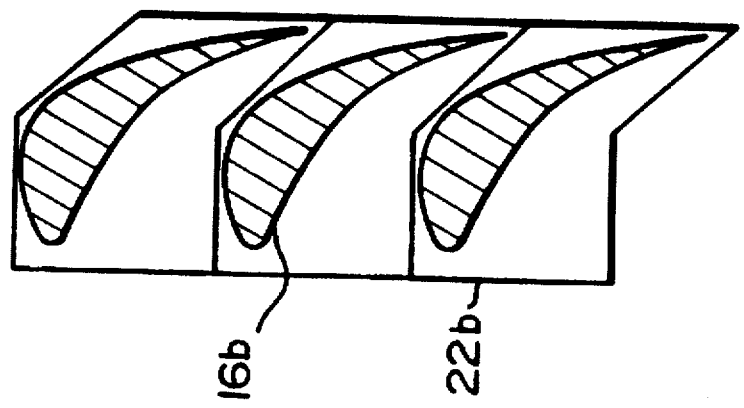
FIGS. 18 and 19 are cross-sectional views thereof taken generally about on lines 18—18 and 19—19 in FIG. 15.
Figure 18:
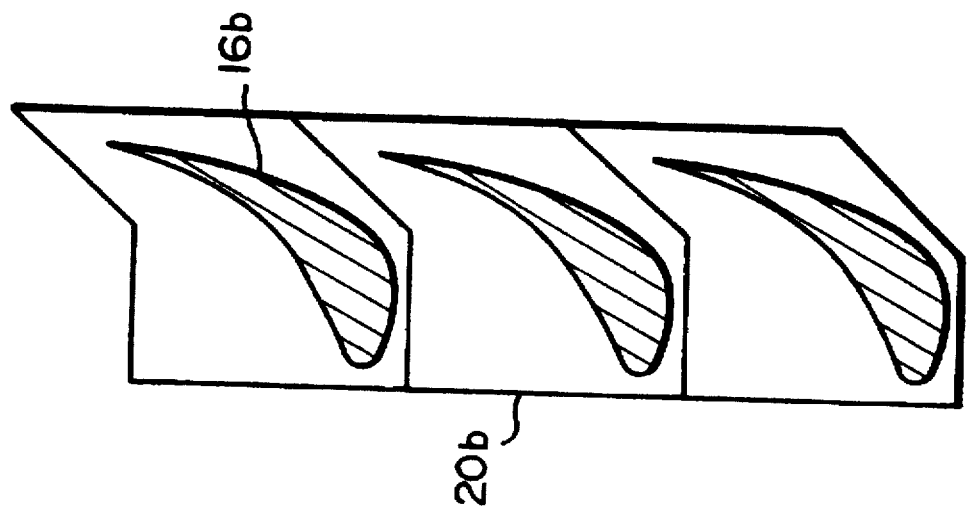

Referring now to the embodiment hereof illustrated in FIGS. 14–19, wherein like reference numerals are applied to like parts followed by the suffix "b," there is illustrated a diaphragm segment 10b having outer and inner rings 12b and 14b, respectively, with partitions 16b mechanically assembled therebetween. Referring to FIGS. 16 and 17, the partitions 16b in this form include a vane 18b having an airfoil configuration and connecting elements 20b and 22b on the tip and root portions, respectively, of the vane 18b. In this form, the connecting element 20b has a forwardly facing dovetail 60, e.g., a groove 60 facing axially upstream relative to the direction of flow, while connecting element 22b has a similarly forwardly facing dovetail, e.g. groove 62. The downstream or back sides of connecting elements 20b and 22b have steps 64 and 66, respectively. Referring now to FIG. 15, the outer ring 12b has a groove 68 generally complementary in shape to a radially outermost portion of connecting element 20b, as well as a flange 70 extending radially inwardly to engage the back side step 64 of connecting element 20b. Similarly, the inner ring 14b has a groove 72 complementary in shape to the connecting element 22b and a radially outwardly directed flange 74 for engaging the back side or aft step 66 of connecting element 22b. In this form, however, the partitions 16b are assembled in an axial direction, i.e., the partitions are applied in an axial downstream direction in the grooves 68 and 72 of the outer and inner rings 12b and 14b, respectively. To retain the partitions in the grooves, outer and inner retainer plates 76 and 78, respectively, are provided. The outer retainer plate 76 overlies the upstream face of outer ring 12b and connecting element 22b. A bolt 80 interconnects the retaining ring 76 and the outer ring 12b to clamp the connecting element 22b between the retainer and outer rings. Preferably, the outer ring 76 has a dovetail or rib 82 received in the complementary dovetail-shaped groove 60 of the connecting element 22b. The inner retainer plate 78 axially overlies the upstream faces of the inner ring 14b and connecting elements 22b of the partitions 16b. The retainer plate 78 is secured to the inner ring 14b by bolts 82. Additionally, the retainer plate 78 has a groove 84 for receiving the projecting rib 86 of the connecting element 20b. It will be appreciated that pins, for example, pins similar to those of the previous embodiment, may also be utilized to secure the partitions to the rings and to transmit the torque load, if necessary. Basically, however, the torque load is transmitted by friction across the clamped surfaces. The pressure loads are transmitted to the turbine housing through the dovetail surfaces and the retainer plate bolts.

It will be appreciated that combinations of the different connections in a single diaphragm may be used. For example, dovetail connections may be used along the outer or inner rings, while pinned or bolted connections may be used along the other of the inner and outer rings. These various combinations of connections will be apparent to those of skill in this technology.

Referring now to the final embodiment of the present invention illustrated in FIG. 20, there is illustrated a version of the pinned connection set forth in drawing FIGS. 8–11 hereof. In order to preclude any possibility of chatter and wear in the mechanical assembly during operation of the turbine, tight axial clearances are necessary. In this form of the invention, there is provided a combination bolt/pin 90 having a threaded surface 92 and smooth pin surfaces 94 and 96. By employing a threaded bolt/pin 90 with the threads 92 engaging complementary threads in the connecting element 20a of partition 16a, it will be appreciated that the clearance between the outer ring 12a and the downstream side of connecting element 20a can be taken up by the threading action. This ensures that the assembly is tight and also prevents flow leakage around the partition. A similar bolt/pin (not shown) can be used to engage complementary threads in the connecting element 22a of partition 16a, it will be appreciated that the clearance between the inner ring 14a and the downstream side of connecting element 22a can be taken up by the threading action.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mechanically assembled turbine diaphragm comprising:

outer and inner rings;

a plurality of partitions, each having an airfoil shape for disposition in a flow path of the turbine diaphragm;

a connecting element carried by the partitions at each of the opposite outer and inner ends thereof for connecting the partitions to the outer and inner rings, respectively, to form with the outer and inner rings the turbine diaphragm; and means for mechanically connecting said outer and inner elements to said outer and inner rings, respectively, to form at least a portion of the turbine diaphragm, said connecting elements at the inner ends of said partitions being mechanically connected to said inner ring independently of one another, said mechanical connecting means including pins for pinning the connecting elements of said inner ends of said partitions to the inner ring.

2. A diaphragm according to claim 1 wherein, said pins for said inner ring have threaded sections engaging threads in said inner connecting elements to take up clearance therebetween.

3. A mechanically assembled turbine diaphragm comprising:

outer and inner rings;

a plurality of partitions, each having an airfoil shape for disposition in a flow path of the turbine diaphragm;

a connecting element carried by the partitions at each of the opposite outer and inner ends thereof for connecting the partitions to the outer and inner rings, respectively, to form with the outer and inner rings the turbine diaphragm; and means for mechanically connecting said outer and inner elements to said outer and inner rings, respectively, to form at least a portion of the turbine diaphragm, said connecting elements at the inner ends of said partitions being mechanically connected to said inner ring independently of one another, said mechanical connecting means including pins for pinning the connecting elements of said outer ends of said partitions and said outer ring to one another.

4. A diaphragm according to claim 3 wherein said pins for said outer ring have threaded sections engaging threads in said outer connecting elements to take up clearance therebetween.

5. A mechanically assembled turbine diaphragm comprising:

outer and inner rings;

a plurality of partitions, each having an airfoil shape for disposition in a flow path of the turbine diaphragm;

a connecting element carried by the partitions at each of the opposite outer and inner ends thereof for connecting the partitions to the outer and inner rings, respectively, to form with the outer and inner rings the turbine diaphragm; and means for mechanically connecting said outer and inner elements to said outer and inner rings, respectively, to form at least a portion of the turbine diaphragm, said connecting elements at the inner ends of said partitions being mechanically connected to said inner ring independently of one another, said connecting elements at the outer ends of said partitions being mechanically connected to said outer ring independently of one another, said mechanical connecting means including pins for pinning the inner and outer connecting elements of said partitions to said inner and outer rings, respectively, said inner connecting elements being spaced from one another in a circumferential direction and said outer connecting elements being spaced from one another in a circumferential direction to avoid accumulation of tolerances in a circumferential direction.

6. A diaphragm according to claim 5 wherein said pins for at least one of said inner ring and said outer ring have threaded sections engaging threads in corresponding inner and outer connecting elements, respectively, to take up clearance therebetween.

7. A mechanically assembled turbine diaphragm comprising:

outer and inner rings;

a plurality of partitions, each having an airfoil shape for disposition in a flow path of the turbine diaphragm;

a connecting element carried by the partitions at each of the opposite outer and inner ends thereof for connecting the partitions to the outer and inner rings, respectively, to form with the outer and inner rings the turbine diaphragm; and means for mechanically connecting said outer and inner elements to said outer and inner rings, respectively, to form at least a portion of the turbine diaphragm, said connecting elements at the inner ends of said partitions being mechanically connected to said inner ring independently of one another, said connecting elements at the outer ends of said partitions being mechanically connected to said outer ring independently of one another, said mechanical connecting means including pins for pinning the connecting elements of said outer ends of said partitions and said outer ring to one another and pins for pinning the connecting elements of said inner ends of said partitions and said inner ring to one another, said inner and outer connecting elements having openings therethrough in registration with openings in said inner and outer rings, respectively, each of said pins having an enlargement at least at one end thereof to prevent removal of the pins from the registering openings.

8. A mechanically assembled turbine diaphragm comprising:

outer and inner rings;

a plurality of partitions, each having an airfoil shape for disposition in a flow path of the turbine diaphragm;

a connecting element carried by the partitions at each of the opposite outer and inner ends thereof for connecting the partitions to the outer and inner rings, respectively, to form with the outer and inner rings the turbine diaphragm; and means for mechanically connecting said outer and inner elements to said outer and inner rings, respectively, to form at least a portion of the turbine diaphragm, said connecting elements at the outer ends of said partitions being mechanically connected to said outer ring independently of one another, said mechanical connecting means including pins for pinning the connecting elements of said outer ends of said partitions to the outer ring.

9. A diaphragm according to claim 8, said pins for said outer ring having threaded sections engaging threads in said outer connecting elements to take up clearance therebetween.

10. A mechanically assembled turbine diaphragm comprising:

outer and inner rings about a common axis;

a plurality of partitions, each having an airfoil shape for disposition in a flow path of the turbine diaphragm;

a connecting element carried by the partitions at each of the opposite outer and inner ends thereof for connecting the partitions to the outer and inner rings, respectively, to form with the outer and inner rings the turbine diaphragm; and generally axially extending members for mechanically connecting said outer and inner elements to said outer and inner rings, respectively, to form at least a portion of the turbine diaphragm, said members being mechanically connected to said rings independently of one another whereby said partitions are connected to said rings independently of one another, said inner and outer connecting elements having openings therethrough in registration with openings in said inner and outer rings, respectively, said members being receivable in said registering openings.

11. A diaphragm according to claim 10 wherein said members for at least one of said inner and outer rings have threaded sections engaging threads in said connecting elements to take up clearance therebetween.

12. A diaphragm according to claim 10 wherein said inner connecting elements are spaced from one another in a circumferential direction and said outer connecting elements are spaced from one another in a circumferential direction to avoid accumulation of tolerances in a circumferential direction.

13. A method for mechanically assembling a turbine diaphragm having outer and inner rings, a plurality of partitions, each having an airfoil shape for disposition in the flow path of the turbine diaphragm and a connecting element at each of the opposite outer and inner ends thereof, comprising the steps of mechanically connecting said outer and inner elements to said outer and inner rings, respectively, to form at least a portion of the turbine diaphragm by independently pinning the connecting elements of said partitions and said outer and inner rings to one another.

* * * * *